United States Patent Office 2,709,520
Patented May 31, 1955

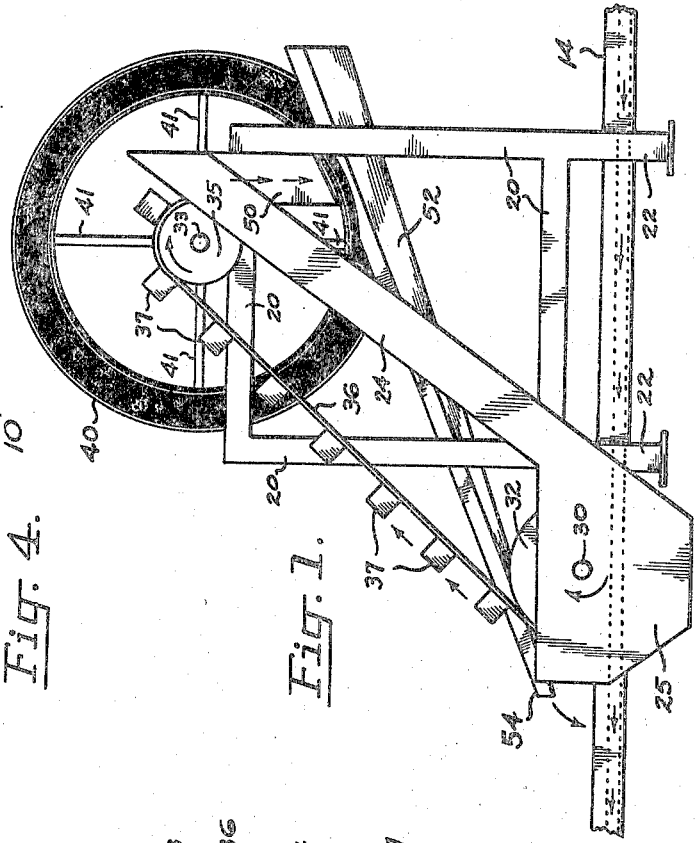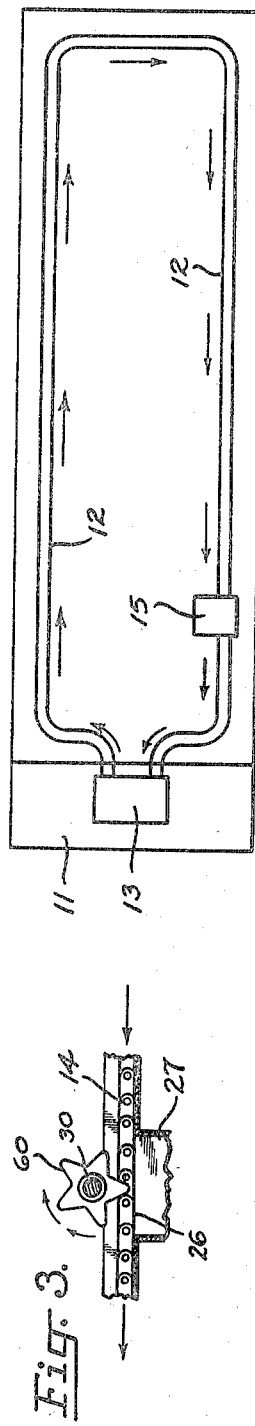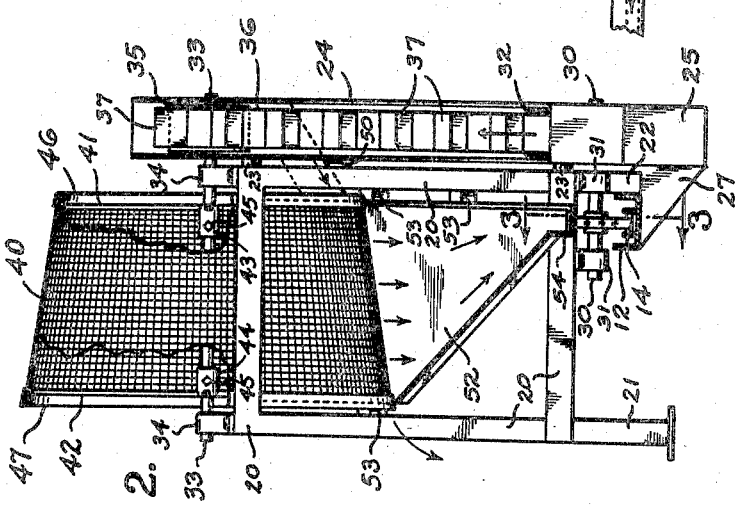

2,709,520

FEED CLEANING APPARATUS

William H. Stark, Vancouver, Wash.

Application May 26, 1953, Serial No. 357,405

9 Claims. (Cl. 209—235)

This invention pertains to apparatus for cleaning feeds of powdered and granular form, such as are used in the feeding of chickens, and relates particularly to novel feed cleaning apparatus adapted to operate automatically in combination with conventional feed disbributing mechanism.

In the commercial raising of chickens the conventional method of distributing feed is to provide a continuous trough circling the interior of the chicken house floor with an endless feed chain positioned for longitudinal movement within the trough. Feed is admitted to the trough usually by automatic feed control mechanism located in the feed storage room. The trough, of course, extends into the feed room for communication with the feed control mechanism.

It is the general experience that the chickens will walk over and into the feed trough, thereby carrying litter into the feed trough where it mixes with the feed. Litter is thus accumulated in the feed trough to such an extent that it not only makes the feeding operation difficult but also tends to clog the feed trough, particularly at the corners, and thereby results in spillage of feed from the trough where it mixes with the litter on the chicken house floor.

Attempts have been made heretofore to overcome the foregoing difficulties by providing chicken feed cleaner apparatus of various types which operate in conjunction with the feed control mechanism. The principal disadvantages of this procedure are that the cleaning apparatus utilizes valuable space in the feed storage room, and also that means is required to collect the litter separated from the feed in the storage room and to frequently remove the litter therefrom. Accordingly, this procedure requires considerable attention, since substantial quantities of litter are separated from the feed.

It is a principal object of the present invention to provide feed cleaning apparatus which may be readily installed on the chicken house floor in the circuit of the feed distributing system, whereby to remove the litter from the feed and to return the litter to the chicken house floor.

Another important object of this invention is the provision of chicken feed cleaning apparatus which is readily installed within the circuit of the feed distributing mechanism and is powered by the moving feed chain, whereby to function only when the feed chain is in operation.

A further important object of the present invention is to provide a feed cleaning apparatus for use in conjunction with conventional feed chain distributing mechanism and which is provided with drive means constructed in such manner as to prevent jamming thereof with the feed chain under most adverse conditions of operation.

A still further object of the present invention is the provision of feed cleaning apparatus which is of simplified construction for economical manufacture, which therefore requires a minimum of maintenance and repair, and is sturdily constructed for long operating life.

The foregoing and other objects and advantages of the present invention will appear from the following detailed description taken in connection with the accompanying drawing, in which:

Figure 1 is a view in side elevation of feed cleaning apparatus embodying the features of the present invention;

Figure 2 is a view in front elevation of the apparatus shown in Figure 1, with parts thereof being broken away to disclose details of construction;

Figure 3 is a fragmentary sectional view taken along the line 3—3 in Figure 2 and showing details of construction of the drive connection of the apparatus with a feed distributing chain of conventional construction; and Figure 4 is a schematic plan view of a chicken house floor illustrating a typical arrangement of a feed distributing system and showing, in block form, the apparatus of the present invention incorporated therewith.

Referring particularly to Figure 4 of the drawing, the floor plan of a chicken house is shown to comprise the main chicken room 10 of elongated rectangular form and a feed storage room 11 at one end thereof. The feed trough 12 encircles the main floor 10 adjacent the walls thereof and then enters the feed room 11 for communication with the feed control apparatus 13. A continuous feed chain 14 (Figure 3) is contained within the trough 12 and is usually driven by means of the power system provided for the feed control mechanism 13.

The apparatus of the present invention, indicated generally by numeral 15 in Figure 4, is adapted to be installed in the circuit of trough 12 and chain 14 within the chicken room 10, preferably at a point adjacent the return side of the feed control mechanism 13, as shown. In this manner the litter, which is deposited within the feed trough along the greatest portion of its circuit, is removed just prior to return of the uneaten feed to the feed control mechanism 13.

Referring now to Figures 1 and 2 of the drawing, the apparatus of the present invention includes an upstanding rectangular frame 20 supported on one side by legs 21 and on the opposite side by legs 22. On the side of the frame adjacent legs 22 there is secured by brackets 23 a channel-shaped shield 24 which terminates at its lower end in an enlarged hopper 25.

As best shown in Figure 2 of the drawing, the hopper 25 and legs 22 are positioned adjacent one side of the feed trough 12, while the legs 21 are positioned at a spaced distance on the opposite side of the trough. The hopper extends below the trough 12, and this is preferably accommodated by forming a pit in the litter of the chicken house floor. The litter is usually composed of sand, wood shavings, sawdust, straw, or other similar material well-known to those skilled in the art. The legs 21 and 22 are also preferably imbedded in the litter for firm support.

A portion of the bottom of the trough 12 is removed adjacent the hopper 25 to form an opening 26 therein. Enclosing said opening on the under side of the trough 12 and extending obliquely downward into communication with the hopper is a downwardly inclined chute 27. Thus, it will be seen that as the feed chain 14 passes over the opening 26, the feed contaminated with litter will drop through the opening and will be directed by the chute 27 into the hopper 25.

A shaft 30, mounted in bearings 31 supported by the frame 20, extends transversely through the hopper 25 adjacent the upper end of the latter. A pulley 32 is secured on shaft 30 within the hopper. A second shaft 33 is mounted parallel with shaft 30 but at the upper end of the frame 20, the shaft being supported for rotation in bearings 34. The shaft 33 extends transversely across the shield 24 adjacent the upper end of the latter and carries pulley 35 thereon. The pulley 35 is positioned between the spaced sidewalls of the shield, as best shown in Figure 2.

An endless belt 36 is reeved over pulleys 32 and 35. Secured to the belt is a plurality of buckets 37 each having a bottom, sidewalls and an outer wall, the bucket being open on the top, i. e. the side facing the direction of movement of the belt, indicated by the arrows in Figures 1 and 2.

Secured upon the shaft 33 between the bearings 34 and between the side pieces of the frame 20 is a conical screen 40. The screen is supported at its inner and outer ends by the radial spokes 41, 42, respectively, which are secured at their centers to lugs 43, 44, respectively. The lugs are secured to shaft 33 by such means as a set screw 45. The outer end of the radial spokes 41, 42 are secured to the supporting bands 46, 47, respectively, provided to reinforce the ends of the screen 40.

A chute 50 communicates at its upper ends with shield 24, the bottom side of the latter being cut away to afford access to the chute 50. The chute extends obliquely downward toward the screen 40 and terminates within the latter adjacent the end having the smaller diameter.

A second chute 52 is secured between the upright portions of frame 20 below the screen 40 by means of brackets 53 secured to the side walls of the chute. The chute extends downwardly in an inclined manner from the rearward side of the screen 40 and terminates in a restricted discharge spout 54 positioned above the feed trough 12 forwardly of the opening 26 which communicates with the hopper 25.

Secured to shaft 30 between the bearings 31 is a star gear 60. The teeth of the star gear are proportioned and arranged for cooperative registration with the openings in the feed chain 14, as best shown in Figure 3. In this manner movement of the chain, for example in the direction of the arrows, rotates the star gear and shaft 30 to drive the bucket conveyor 36, 37. Movement of the bucket conveyor causes rotation of pulley 35 which, in turn, rotates shaft 33 and drives the screen 40.

It is a frequent occurrence that objects such as sticks, stones and other substantially rigid materials are deposited within the trough 12 and move with the chain 14. Accordingly, it has been found desirable to construct the star gear 60 of a substantially flexible material, such as leather or rubber or other suitable material capable of being distorted. Thus, as the chain 14 carries such solid material into contact with the rotating gear, the latter will bend to permit passage of the solid material. It has been found, for example, that when the gear is constructed of metal it tends to jam with the chain upon engagement with solid materials carried upon the chain. Under such conditions the chain 14 is forced downwardly into the opening 26 and, under severe strain, becomes broken. The use of a flexible gear completely avoids this difficulty and yet provides positive driving connection for the cleaning apparatus.

In view of the fact that the continuous trough 12 is conventionally constructed of sections joined end to end, it is contemplated that the apparatus of the present invention may include a section of trough in which the opening 26 has been formed. In this manner the apparatus is installed in the circuit of a feeding trough merely by replacing a conventional section of trough with the apertured section.

The operation of the cleaning apparatus described hereinbefore is as follows: With the apparatus installed as previously described and the feed chain 14 put in motion to distribute the feed metered in proper quantity by the control mechanism 13, star wheel 60 is caused to rotate, whereupon the bucket conveyor 36, 37 is put in motion in the direction of the arrows in Figures 1 and 2. As the chain 14 passes over the opening 26, the feed carried by the chain falls by gravity through said opening and passes along chute 27 into the bottom of hopper 25. Here the feed is picked up in the buckets 37 and conveyed to the upper end of the conveyor system. As the buckets pass over the upper pulley 35 the contaminated feed falls by gravity into the chute 50 and thence onto the inner surface of the conical screen 40. The mesh size of the screen is so chosen as to permit the passage therethrough of the feed, which may be a powder or pellets of various sizes, and to retain upon this screen such larger materials as constitutes the litter. Thus, as the screen rotates with the motion of the bucket conveyor, the feed is passed through the screen onto the inclined chute 52 and the litter is rolled laterally outward over the larger end of the screen where it falls to the floor of the chicken house. The feed passes downwardly over the chute 52 and out through the discharge spout 54 into the feed trough 12 forwardly of the opening 26. The moving chain 14 picks up this clean feed and redistributes it along the chute 12, together with an additional supply from the control mechanism 13 to compensate for the quantity of feed consumed.

It will be understood that the cleaning apparatus is in operation only during the time that feed is being distributed in the feeding trough 12 during the feeding hours. Accordingly, the litter separated from the feed and deposited upon the floor adjacent the screen 40 is permitted to accumulate until it is convenient for an attendant to either remove it or to redistribute it over the floor of the chicken house. Since the separated litter is accumulated within the main chicken house area 10, the space occupied by it is of no concern, as distinguished from the usual procedure wherein the litter is collected in the store room 11.

From the foregoing description, it will be apparent that the present invention provides for the cleaning of chicken feed with efficiency and economy. The apparatus is of simplified construction, requiring a minimum of maintenance and repair. The major difficulty of operation of such apparatus is completely overcome by the provision of the flexible star gear 60 which permits the passage of solid materials without damage to the equipment or interruption of operation. The apparatus is preferably powered by the feed distributing chain 14 and thus does not involve additional expensive power equipment. Furthermore, the cleaning apparatus is put in operation automatically with the movement of the feed chain 14, thereby avoiding the necessity of personal attention in controlling its operation.

It will be apparent to those skilled in the art that various changes and modifications may be made in the structural details described hereinbefore without departing from the scope and spirit of the present invention. For example, the screen 40 may be constructed as a cylinder having a uniform diameter, the same being preferably tilted slightly to facilitate movement of the litter therethrough to the discharge side. Alternatively, the rotary screen may be replaced by a vibratory screen. The vibratory screen may be driven by shaft 33 in various ways well-known in the art. Various types of conveyor mechanism may be substituted for the bucket conveyor system 36, 37 described hereinbefore. The enclosed buckets 37 are preferred, however, since they serve to contain the feed and thus prevent abrasion and pulverization of such feed materials as pellets, grain, and other materials which are desired to be retained in substantial size.

The foregoing and other changes will be recognized by those skilled in the art. Accordingly, the foregoing description is to be considered merely as illustrative of the invention and is not to be considered as limiting the scope thereof.

Having now described my invention and the manner in which the same may be used, what I claim as new and desire to secure by Letters Patent is:

1. In combination with feed distributing mechanism including a continuous feed trough and a continuous feed chain contained slidably therein, a feed cleaner comprising a hopper adjacent and below the feed trough, the feed trough having an opening therein below the feed chain and communicating with the hopper, a frame, a screen mounted movably on the frame, inclined conveyor means supported by the frame and positioned at its lower end in the hopper and at its upper end for communication with the screen, discharge means under the screen and having a discharge end positioned above the feed trough on the outfeed side of the hopper opening, and drive means for the conveyor means and screen.

2. In combination with feed distributing mechanism including a continuous feed trough and a continuous driven feed chain contained slidably therein, a feed cleaner comprising a hopper adjacent and below the feed trough, the feed trough having an opening therein below the feed chain and communicating with the hopper, a frame, a screen mounted movably on the frame, inclined conveyor means supported by the frame and positioned at its lower end in the hopper and at its upper end for communication with the screen, discharge means under the screen and having a discharge end positioned above the feed trough on the outfeed side of the hopper opening, and drive means interconnecting the screen and conveyor means and feed chain for driving the screen and conveyor means by the feed chain.

3. The feed cleaner of claim 2 wherein the drive means interconnecting the conveyor means and the feed chain comprises a shaft secured to the conveyor means, and a flexible gear secured on the shaft and resiliently engaging the feed chain.

4. In combination with feed distributing mechanism including a continuous feed trough and a continuous feed chain contained slidably therein, a feed cleaner comprising a hopper adjacent and below the feed trough, the feed trough having an opening therein below the feed chain and communicating with the hopper, a frame, an inclined screen mounted movably on the frame, inclined bucket conveyor means supported by the frame and positioned at its lower end in the hopper and at its upper end for communication with the screen, the screen being positioned with its upper end adjacent the upper end of the conveyor means and proportioned to pass the feed therethrough and to retain thereon materials larger in size than the feed for ultimate discharge from the lower end of the screen, discharge means under the screen and having a discharge end positioned above the feed trough on the outfeed side of the hopper opening, and drive means for the conveyor means and screen.

5. In combination with feed distributing mechanism including a continuous feed trough and a continuous driven feed chain contained slidably therein, a feed cleaner comprising a hopper adjacent and below the feed trough, the feed trough having an opening therein below the feed chain and communicating with the hopper, a frame, a lower shaft and an upper shaft mounted for rotation on the frame, pulleys on the shaft, a rotary screen on the upper shaft, conveyor means reeved over the pulleys and positioned at its lower end in the hopper and at its upper end for communication with the screen, a gear on the lower shaft engaging the feed chain, whereby motion of the latter is caused to drive the conveyor means and screen, and discharge means under the screen and having a discharge end positioned above the feed trough on the outfeed side of the hopper opening.

6. In combination with feed distributing mechanism including a continuous feed trough and a continuous driven feed chain contained slidably therein, a feed cleaner comprising a hopper adjacent and below the feed trough, the feed trough having an opening therein below the feed chain and communicating with the hopper, a frame, a lower shaft and an upper shaft mounted for rotation on the frame, pulleys on the shaft, a rotary screen on the upper shaft, bucket conveyor means reeved over the pulleys and positioned at its lower end in the hopper and at its upper end for communication with the screen, a flexible gear on the lower shaft resiliently engaging the feed chain, whereby motion of the latter is caused to drive the conveyor means and screen, and discharge means under the screen and having a discharge end positioned above the feed trough on the outfeed side of the hopper opening.

7. In combination with feed distributing mechanism including a continuous feed trough and a continuous driven feed chain contained slidably therein, a feed cleaner comprising a hopper adjacent and below the feed trough, the feed trough having an opening therein below the feed chain and communicating with the hopper, a frame, a lower shaft and an upper shaft mounted for rotation on the frame, pulleys on the shaft, a conical rotary screen on the upper shaft, bucket conveyor means reeved over the pulleys and positioned at its lower end in the hopper and at its upper end for communication with the screen, chute means communicating with the upper end of the conveyor means and the screen for transferring the feed to be cleaned from the conveyor means to the screen, a flexible gear on the lower shaft resiliently engaging the feed chain, whereby motion of the latter is caused to drive the conveyor means and screen, and discharge means under the screen and having a discharge end positioned above the feed trough on the outfeed side of the hopper opening.

8. In combination with feed distributing mechanism including a continuous feed trough and a continuous driven feed chain contained slidably therein, a feed cleaner comprising collector means communicating with the feed trough for collecting the contents of said trough as said contents are delivered by the feed chain, a frame, a screen mounted movably on the frame, movable conveyor means extending between the collector means and screen for delivering the contents of the feed trough to the screen, discharge means under the screen and having a discharge end positioned above the feed trough on the outfeed side of the collector means, and drive means interconnecting the screen and conveyor means and feed chain for driving the screen and conveyor means by the feed chain.

9. In combination with feed distributing mechanism including a continuous feed trough and a continuous driven feed chain contained slidably therein, a feed cleaner comprising collector means communicating with the feed trough for collecting the contents of said trough as said contents are delivered by the feed chain, a frame, a screen mounted movably on the frame, movable conveyor means extending between the collector means and screen for delivering the contents of the feed trough to the screen, discharge means under the screen and having a discharge end positioned above the feed trough on the outfeed side of the collector means, and flexible drive means connected to the conveyor means and resiliently engaging the feed chain, whereby motion of the latter is caused to drive the conveyor means.

References Cited in the file of this patent

UNITED STATES PATENTS

| Number | Name | Date |
|---|---|---|
| 1,770,552 | Robb | July 15, 1930 |
| 2,591,609 | Roberts | Apr. 1, 1952 |